2,786,072
PRODUCTION OF ADIPONITRILE

Harry B. Copelin and Frederick J. Feldhousen, Jr., Niagara Falls, N. Y., assignors to E. I. du Pont de Nemours & Company, Wilmington, Del., a corporation of Delaware No Drawing. Application February 5, 1954, Serial No. 408,582

9 Claims. (Cl. 260—465.8)

This invention relates to the manufacture of adiponitrile.

Commercially important adiponitrile, an intermediate in the production of nylon, is frequently made by the cyanation of 1,4-dichlorobutane according to the equation:

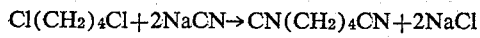
$$Cl(CH_2)_4Cl + 2NaCN \rightarrow CN(CH_2)_4CN + 2NaCl$$

Heretofore, cyanide has been used in this reaction in its crystalline state, preferably finely divided for best results. Crystalline sodium cyanide is, however, the most expensive form of the compound and its cost burdens considerably the economics of the process. The value of the reaction would be materially increased if a method could be found for utilizing relatively cheap cyanide solutions made up, for example, by absorbing gaseous hydrogen cyanide in aqueous caustic soda.

A general object of this invention is consequently provision of an improved method for accomplishing the cyanation of organic halides, the chlorides in particular. Another object of the invention is provision of an improved process for effecting the cyanation of 1,4-dichlorobutane. Yet another object of the invention is provision of a method for accomplishing the cyanation of 1,4-dichlorobutane which avoids the use of solid cyanides. A further object of the invention is provision of a method for carrying out the cyanation of 1,4-dichlorobutane utilizing aqueous cyanide solutions.

The above-mentioned and still further objects of the invention may be accomplished by a process in which an aqueous cyanide solution is fed into a mixture of adiponitrile and 1,4-dichlorobutane and the water is flash evaporated from the reacting mixture primarily by the heat of reaction.

Sodium cyanide is the preferred cyanation compound but other alkali or alkaline earth metal cyanides, such as that of potassium or calcium, for example, can be utilized as well. For best results from the stand-point of yield and also of heat-conservation, concentrated solutions containing 30–40% of the cyanide should be utilized. Heat must sometimes be added from an external source to provide sufficient evaporation of the water. A steam jacket around the reaction vessel, maintained at a temperature of about 10° C. above the desired cyanation temperature, affords a convenient supply of external heat.

In the preferred mode of carrying out this invention, no cyanation solvent other than adiponitrile is utilized. German Patent 881,340 (1953) shows anhydrous adiponitrile alone as the solvent for the desired reaction. It is not necessary, however, that the adiponitrile be anhydrous. In fact, much better results are generally obtained if at least a small amount of water, 1% for example, is present. Conversion rates are so slow if less than about 1% water is present that use of the reaction is completely impracticable. It is consequently undesirable that all the water be flashed from the reacting system. When adiponitrile is used as the solvent for the reaction, operation is conveniently maintained at atmospheric pressure and a temperature of about 130–160° C. Around 140° C. at normal pressure is found to be about optimum.

The amount of water retained in the reaction mixture is not strictly critical. All can be flashed off if it is so desired. As noted above, however, at least about 1% water in the solvent is necessary if practical conversion rates are to be maintained. If above about 10% is utilized, various side products, such as ethers and tars, begin to interfere noticeably with the yield. An optimum concentration of water is about 1–8% and is easily maintained by the evaporation method described.

In practice, water flashed or steamed off the reaction mixture contains a small amount of 1,4-dichlorobutane. Recovery of the organic compound is not difficult since water and dichlorobutane are mutually insoluble. The evolved vapors are merely condensed and the resulting liquid allowed to stand. Dichlorobutane then settles to the bottom. Separation of the two liquid layers by decantation and recycle of the dichlorobutane to the reactor is easily carried out. If it is so desired, the heat of condensation of the vapors flashed from the reactor may be used to preheat the adiponitrile-dichlorobutane reaction mixture.

There follow some examples which illustrate in detail the practice of the invention.

Example 1

This example shows effects of a temperature around optimum and a relatively low sodium cyanide concentration on the reaction.

A reaction was carried out by continuously passing a 15% aqueous solution of sodium cyanide and a mixture of 1,4-dichlorobutane and adiponitrile into a conventional reactor for about two hours with stirring. To initiate the run, pure adiponitrile was placed in the reactor and dichlorobutane and the cyanide solution fed separately thereinto until a weight of dichlorobutane corresponding to 0.7 the weight of adiponitrile had been added. Thereafter, a 0.7:1.0 dichlorobutane-adiponitrile feed mixture was employed. Feed rates were maintained to hold the ratio of sodium cyanide to dichlorobutane as close to the theoretical for complete reaction as possible. Fluctuations in the pumping rates, however, caused variations in the sodium cyanide of ±5–10% of the theoretical value. The temperature inside the reactor was held at 140° C. throughout the run. Pressure was atmospheric, ca. 760 mm. Water was evaporated into a condenser attached to the reactor to maintain about 1.75% water in the reaction mixture, condensed and decanted from dichlorobutane as described above. A mixture of adiponitrile and salt was continuously withdrawn from an outlet in the reactor some distance from the inlet to maintain a constant level therein. The adiponitrile was separated from the salt by filtration and distillation. 73% of the dichlorobutane was converted to chlorovaleronitrile and adiponitrile, with an 81.1% yield of the latter. About 1.75% water was found in the product.

Example 2

This example shows the influence of an increased concentration of sodium cyanide at approximately optimum temperature.

The run of Example 1 was substantially repeated except that a 30% solution of sodium cyanide in water was utilized as the feed. About 81% of the dichlorobutane was converted with an 87% yield of adiponitrile.

The feed rate of the cyanide solution was lower in this example than in the first. Approximately equivalent weights of cyanide were therefore used in both runs.

Example 3

This example shows the improvement obtained by operating at a preferred concentration of sodium cyanide.

The procedure of Example 2 was substantially repeated except that a 35% solution of sodium cyanide was used throughout the run. The feed rate of NaCN solution was 7.65 lbs./hr. while that of dichlorobutane was 3.09 lbs./hr. Water was flashed off at the rate of 29 ml./min. or 3.84 lbs./hr. Conversion of dichlorobutane was 86% with an adiponitrile yield of about 91.3%.

*Example 4*

This example shows the effect of overly-increased feed rates and demonstrates that the improvement of Example 3 is obtained from the concentration of the cyanide.

The run of Example 3 was substantially repeated except that the feed rate of the reactants was doubled. 73 ml./min. of water were evaporated off. Yield of adiponitrile remained at about 91.3% but conversion of dichlorobutane fell to 76%.

*Example 5*

This example shows the effect of a temperature slightly above the optimum.

The run of Example 3 was repeated except that the temperature in the reactor was held at 150° C. The conversion of dichlorobutane was about 83% with an adiponitrile yield of 88.3%.

*Example 6*

This example shows the undesirable effect of excess cyanide upon the reaction.

The run of Example 3 was substantially repeated except that 119% of the theoretical sodium cyanide was used in the overall reaction. Conversion of dichlorobutane was 77% with an adiponitrile yield of about 86.

Several advantages of this invention will be apparent from the foregoing examples. Thus use of crystalline sodium cyanide has been obviated entirely, cyanide solutions being substituted therefor. In addition a method has been provided for controlling the water content of the cyanation system at any desired level. Control is of course accomplished by merely adjusting the temperature and pressure within the reactor. It should perhaps be noted that the employment of water to increase the rate of cyanation to a practicable figure forms no part of this invention. Control of the water content as described, however, makes possible use of a continuous rather than a batch process.

Various changes can be made in the procedure described without departing from the spirit of the invention. Thus the 0.7:1.0 weight ratio of dichlorobutane to adiponitrile need not be strictly maintained. For best results, however, it is essential that the reaction mixture be suitably diluted with the reaction product, adiponitrile. To this end, the mixture should initially contain not less than about one mole of adiponitrile for each mole of dichlorobutane to be employed. Good results may be obtained within the range of about 1 to 3 moles of adiponitrile per mole of dichlorobutane. The desired ratio is most easily maintained by the procedure shown, feeding a previously prepared mixture of adiponitrile and dichlorobutane to a reactor simultaneously with the cyanide solution. A greater proportion of adiponitrile than indicated by the 1–3:1 ratio can be used but is unnecessary and may slow down the reaction by diluting the dichlorobutane excessively.

The optimum temperature for the cyanation as carried out by this invention is around 140° C. It is possible, however, to operate between 130° and 150° C. at atmospheric pressure. Between 120° and 130° C. the reaction mixture may become a wet salt cake, very sticky in nature, which adheres to the reactor. Operation under vacuum can be utilized at these lower temperatures. At around 150° C. yield begins to fall off, increased by-products being formed, while at around 160° C. slight superatmospheric pressure is required. Flash evaporation of solvent water can of course be utilized at about any temperature above the boiling point thereof but for the purposes of this invention is most conveniently carried out at the preferred reaction temperature, i. e., 130°–160° C.

The relative proportions of the dichlorobutane and sodium cyanide utilized are conventional or substantially theoretical, i. e., approximately two moles of the cyanide for each mole of dichlorobutane. If desired, a small excess of the latter may be used. As shown by Example 6, however, an excess of cyanide should be avoided.

Liquids other than adiponitrile alone or mixtures of adiponitrile and water can be used as the cyanation solvent in this reaction. Suitable solvents include, among many others, nitriles liquid at the reaction temperature such as valeronitrile, caprylonitrile and phenylacetylnitrile, the amides such as dimethylformamide disclosed in copending U. S. application S. N. 321,510, filed November 19, 1952, now Patent No. 2,715,137, and the oxygen compounds, such as methyl "Cellosolve," of U. S. P. 2,415,261. Use of such materials, however, raises problems of separating the solvent from the products and, more particularly, from the water and dichlorobutane with which they flash over. Consequently, use of the adiponitrile or adiponitrile-water mixtures is preferred.

While the invention has been described with reference to a preferred mode, a continuous process, it is not restricted thereto. It can also be used with a batch process. The desired quantity of 1,4-dichlorobutane and adiponitrile can be put into a reactor such as an autoclave and the cyanide solution added thereto. Excess water can then be flashed off as described above by maintaining a temperature within the 130°–160° C. range.

Having described the invention, we claim:

1. The process for producing adiponitrile which comprises continuously bringing together 1,4-dichlorobutane and aqueous sodium cyanide in a reaction solvent chosen from the group consisting of liquid nitriles and amides while controlling the amount of water present in the resultant mixture to maintain around 1 to 8% by weight by flashing part of the water from the aqueous cyanide as it contacts said mixture.

2. The process for producing adiponitrile which comprises continuously bringing together 1,4-dichlorobutane and aqueous sodium cyanide in adiponitrile solvent while controlling the amount of water present in the resultant mixture to maintain around 1 to 8% by weight by flashing part of the water from the aqueous cyanide as it contacts said mixture.

3. The process which comprises continuously adding 1,4-dichlorobutane and an aqueous solution of sodium cyanide to adiponitrile at a temperature of around 130°–150° C., continuously flashing water from said cyanide solution to maintain around 1–8% by weight thereof in the reaction mixture while continuously reacting said 1,4-dichlorobutane and sodium cyanide to produce adiponitrile.

4. The process of claim 3 in which the temperature of the adiponitrile is around 140° C. and the aqueous solution contains about 30–40% by weight of sodium cyanide.

5. The process which comprises continuously contacting a mixture of 1,4-dichlorobutane and adiponitrile with an aqueous solution of sodium cyanide, continuously flashing water from said cyanide solution to maintain about 1–8% by weight thereof in the mixture, continuously reacting the cyanide with the 1,4-dichlorobutane and continuously withdrawing part of said mixture and separating adiponitrile therefrom.

6. The process of claim 5 in which the 1,4-dichlorobutane:adiponitrile mole ratio in the mixture thereof is from about 1:1 to about 1:3.

7. The process of claim 6 in which the sodium cyanide solution is of 30–40% strength.

8. The process of claim 7 in which the temperature is about 130°–150° C. and the pressure is atmospheric.

9. The process which comprises continuously contacting a mixture of 1,4-dichlorobutane and adiponitrile of mole ratio 1:1–3 with an aqueous solution containing 30–40% by weight of sodium cyanide, flashing water from said solution to maintain 1–8% by weight thereof in the mixture, agitating said mixture after contacting it with sodium cyanide and reacting the dichlorobutane with sodium cyanide to produce salt and adiponitrile and continuously separating adiponitrile from said salt.

References Cited in the file of this patent

UNITED STATES PATENTS

| | | |
|---|---|---|
| 2,211,240 | Macallum | Aug. 13, 1940 |
| 2,342,101 | Cass et al. | Feb. 22, 1944 |
| 2,581,354 | Bordner | Jan. 8, 1952 |